UNITED STATES PATENT OFFICE.

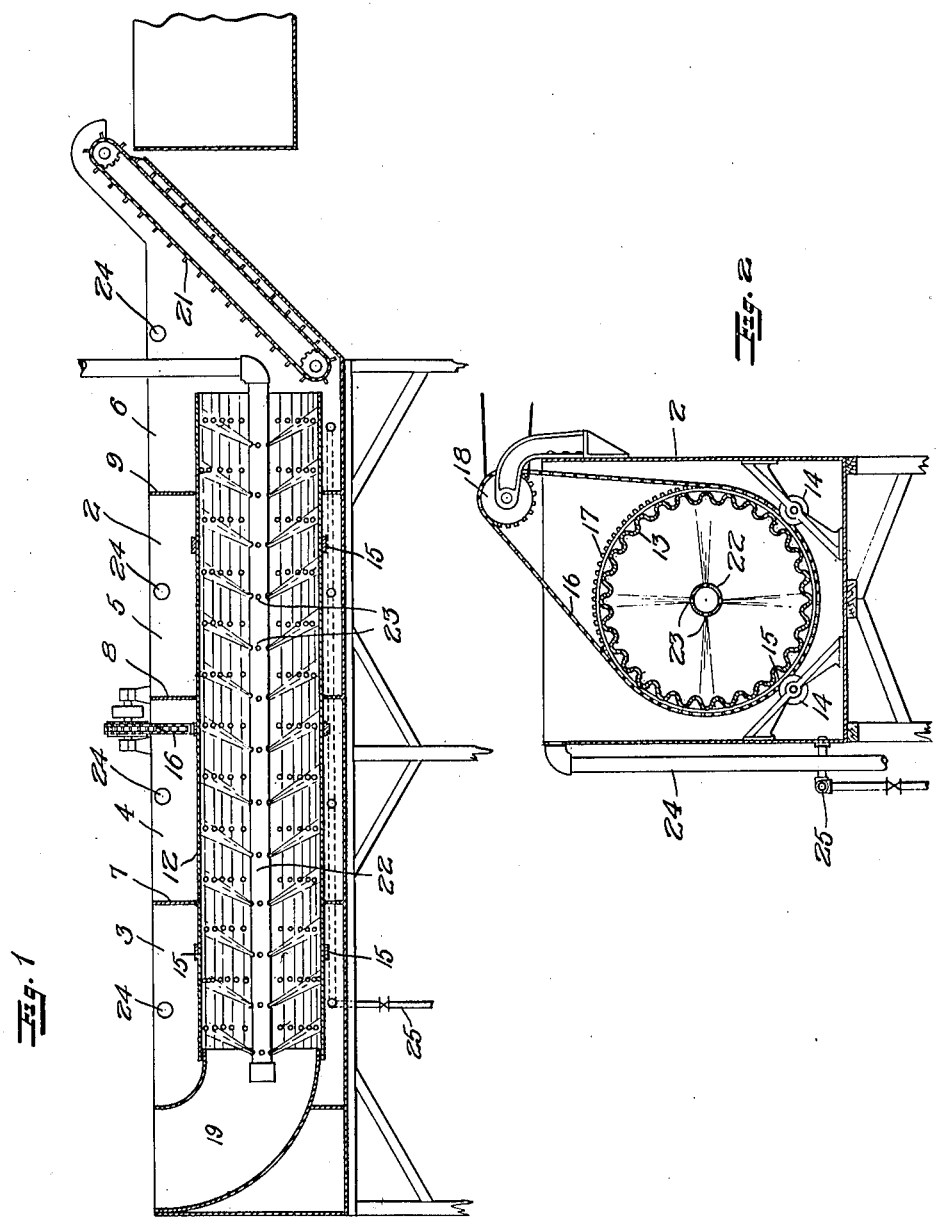

GEORGE W. SHANNON, OF TURLOCK, CALIFORNIA.

PROCESS AND APPARATUS FOR REMOVING THE SKIN FROM FRUIT.

1,280,879.  Specification of Letters Patent.  Patented Oct. 8, 1918.

Application filed March 24, 1917. Serial No. 157,106.

*To all whom it may concern:*

Be it known that I, GEORGE W. SHANNON, a citizen of the United States, and a resident of Turlock, county of Stanislaus, and State of California, have invented a certain new and useful Process and Apparatus for Removing the Skin from Fruit, of which the following is a specification.

My invention relates to a process of and apparatus for removing the skin from peaches and other kinds of fruit and vegetables.

In preparing peaches and other fruit for canning, the skins of the fruit are usually first loosened or disintegrated by subjecting the fruit to the action of a solution of caustic soda, which reduces the skin to a loose pulpy mass.

An object of my invention is to provide an apparatus for removing the previously disintegrated skin and to wash the fruit to remove from it the caustic soda solution in which it had been previously immersed.

Fruit is sometimes peeled whole and sometimes it is halved and pitted before being peeled and a further object of my invention is to provide an apparatus for thoroughly washing the pit cavity of the caustic soda solution.

Another object of my invention is to provide unitary means for simultaneously washing the previously disintegrated skin from the fruit and advancing the fruit through the apparatus.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown only one form of my invention, but it is to be understood that the invention as expressed in the claims may be embodied in a plurality of forms.

Referring to said drawings:

Figure 1 is a vertical longitudinal section of the apparatus of my invention.

Fig. 2 is a cross section of the apparatus.

In accordance with my invention I submerge the fruit with its previously disintegrated skin, in water or other suitable liquid, and direct jets of air under pressure against the submerged fruit. These jets act directly on the fruit to remove the disintegrated skin and indirectly by causing an agitation of the water and also by driving the fruit through the water. These actions thoroughly remove the disintegrated skin from the fruit and thoroughly wash the fruit of the caustic soda solution, both on the surface and in the pit cavity. The jets of air also act to feed the fruit through the apparatus.

The apparatus of my invention comprises a suitable tank 2, preferably rectangular in shape, which is divided into a plurality of compartments 3, 4, 5, 6 by the partition walls 7, 8 and 9. Arranged in the tank and extending through openings in the partitions walls, is a rotatable open ended drum 12 having preferably a circumferentially corrugated perforated surface 13. The drum is preferably mounted on rollers 14 arranged within the tank and is provided with circumferential bands or tracks 15 for engagement with the rollers. The drum is preferably rotated by a chain 16 engaging a gear 17 on the drum and a driving sprocket 18 mounted on the tank or other suitable support. At one end, the tank is provided with a fruit feed chute 19 which extends into the open end of the drum and at the other end the tank is provided with a suitable inclined conveyer 21 for removing the washed fruit from the tank after it is discharged from the drum.

Arranged longitudinally within the drum and preferably concentric therewith, is a pipe 22 containing air under pressure from a suitable source and provided with a plurality of nozzles or apertures 23 for projecting jets of air toward the wall of the drum. These apertures or nozzles 23 are inclined from a plane perpendicular to the axis, toward the discharge end of the drum, so that the air jets propel the fruit longitudinally through the drum.

The tank is filled with water and each compartment is provided with an overflow pipe 24. During the operation of the apparatus water is continuously introduced into the separate compartments from the supply pipe 25. The openings in the partition walls are of sufficient size to accommodate the drum, but not much larger, so that free circulation between the compartments is not established except through the drum.

The fruit, with the skin previously disintegrated, is fed into the chute 19 and sinks through the water therein and enters the rotating drum. The fruit is caught by the corrugations in the drum and lifted and dropped through the water therein. During such action the fruit is subjected to the air jets, which preferably issue at about fifty pounds pressure and the skin is removed from the fruit. The air jets also agitate the water and drive the fruit through the water, insuring the complete removal of the skin and the thorough washing of the fruit. During this action the fruit is being propelled toward the discharge end of the drum. The removed disintegrated skin is driven by the air jets through the apertures in the drum and floats to the surface of the water in the compartment, whence it discharges through the overflow pipe. The major proportion of the skin will be removed in compartment 3 and the successive compartments will receive successively lesser amounts, so that the fruit is successively subjected to cleaner water as it passes through the drum, thereby insuring its thorough washing.

I claim:

1. The method of removing previously disintegrated skin from fruit which consists in submerging the fruit in liquid and subjecting the submerged fruit to the action of jets of air under pressure.

2. The method of removing previously disintegrated skin from fruit which consists in submerging the fruit in liquid, moving the fruit through said liquid and subjecting the moving fruit to the action of jets of air under pressure.

3. The method of removing previously disintegrated skin from fruit which consists in submerging the fruit in a bath of liquid agitated by jets of air under pressure discharging within the body of the liquid.

4. The method of removing previously disintegrated skin from fruit which consists in submerging the fruit in liquid and propelling the fruit through the liquid by jets of air under pressure.

5. In an apparatus for removing previously disintegrated skin from fruit, a tank adapted to contain liquid, a rotatable drum submerged in said liquid, and means within the drum for directing jets of air under pressure at an inclination to the plane perpendicular to the axis of the drum.

6. In an apparatus for removing previously disintegrated skin from fruit, a tank adapted to contain liquid, a rotatable open end drum submerged in said liquid, means for feeding fruit into one end of the drum and means within the drum for directing jets of air under pressure toward the opposite end of the drum.

In testimony whereof I have hereunto set my hand at Turlock, California, this 13th day of March, 1917.

GEORGE W. SHANNON.